(12) United States Patent
Goin et al.

(10) Patent No.: US 10,365,586 B1
(45) Date of Patent: Jul. 30, 2019

(54) END SEAL ASSEMBLY FOR AN UNDERCUT DEVELOPER ROLL

(71) Applicant: LEXMARK INTERNATIONAL, INC., Lexington, KY (US)

(72) Inventors: Richard Louis Goin, Lexington, KY (US); Donald Wayne Stafford, Lexington, KY (US)

(73) Assignee: LEXMARK INTERNATIONAL, INC., Lexington, KY (US)

( * ) Notice: Subject to any disclaimer, the term of this patent is extended or adjusted under 35 U.S.C. 154(b) by 0 days.

(21) Appl. No.: 15/919,343

(22) Filed: Mar. 13, 2018

(51) Int. Cl.
*G03G 15/08* (2006.01)
*F16J 15/3248* (2016.01)

(52) U.S. Cl.
CPC ...... *G03G 15/0898* (2013.01); *F16J 15/3248* (2013.01); *G03G 15/0808* (2013.01); *G03G 15/0817* (2013.01); *G03G 2221/1648* (2013.01)

(58) Field of Classification Search
CPC .......... G03G 15/0898; G03G 15/0817; G03G 15/0806; G03G 15/0818
USPC .................. 399/103, 105, 279, 286
See application file for complete search history.

(56) References Cited

U.S. PATENT DOCUMENTS

| | | | |
|---|---|---|---|
| 5,057,868 A | 10/1991 | Sekino et al. | |
| 5,212,521 A | 5/1993 | Ogawa et al. | |
| 5,389,732 A | 2/1995 | Sekino | |
| 5,475,467 A | 12/1995 | Watanabe et al. | |
| 5,488,462 A | 1/1996 | Ishikawa et al. | |
| 5,555,184 A | 9/1996 | Jaskowiak et al. | |
| 5,870,651 A | 2/1999 | Shimada | |
| 6,341,206 B1 | 1/2002 | Yamaguchi et al. | |
| 6,487,383 B2 | 11/2002 | Buchanan et al. | |
| 6,553,195 B2 | 4/2003 | Korthage et al. | |
| 6,591,074 B1 | 7/2003 | Michlin | |
| 6,985,683 B2 | 1/2006 | Foster et al. | |
| 6,996,353 B2 | 2/2006 | Schell | |
| 7,239,824 B2 | 7/2007 | Fukuta | |
| 7,539,438 B2 | 5/2009 | van Leipsig et al. | |
| 7,561,820 B2 | 7/2009 | Gayne et al. | |
| 7,623,807 B2 | 11/2009 | Carter, II et al. | |
| 7,627,265 B2 | 12/2009 | Gayne et al. | |
| 8,099,012 B2 | 1/2012 | Askren et al. | |
| 8,116,657 B2 | 2/2012 | Kant et al. | |
| 8,644,725 B2 | 2/2014 | Brown et al. | |

(Continued)

FOREIGN PATENT DOCUMENTS

EP    2657785 A2    10/2013

*Primary Examiner* — William J Royer

(57) ABSTRACT

A developer unit for an electrophotographic image forming device includes a developer roll rotatably mounted on a housing. The developer roll includes a roll body cylindrically disposed around a shaft and forming an outer circumferential surface of the developer roll. An axial end of the roll body includes an undercut forming a hollow region in the axial end of the roll body. An elastomeric end seal has a curved rotary seal portion that is sandwiched between a portion of the housing and the outer circumferential surface of the developer roll at the axial end of the developer roll. An interference between the curved rotary seal portion of the end seal and the outer circumferential surface of the developer roll decreases along an axial dimension of the developer roll in a direction from an axially outboard edge of the end seal toward an axially inboard edge of the end seal.

6 Claims, 9 Drawing Sheets

(56) References Cited

U.S. PATENT DOCUMENTS

| | | | |
|---|---|---|---|
| 8,855,526 B2* | 10/2014 | Ito et al. | G03G 15/0817 |
| | | | 399/103 |
| 8,886,080 B2 | 11/2014 | Allen et al. | |
| 8,948,649 B2 | 2/2015 | McCoy et al. | |
| 9,164,420 B2* | 10/2015 | Handa | G03G 15/0817 |
| 9,268,262 B2* | 2/2016 | Shoji et al. | G03G 15/0898 |
| 9,835,978 B2 | 12/2017 | Castle et al. | |
| 2002/0141777 A1 | 10/2002 | Kamimura et al. | |
| 2004/0001727 A1 | 1/2004 | Akutsu | |
| 2006/0204273 A1 | 9/2006 | Kawai | |
| 2007/0034099 A1 | 2/2007 | Gayne et al. | |
| 2007/0071489 A1 | 3/2007 | Nakaya et al. | |
| 2016/0259271 A1 | 9/2016 | Ooyoshi | |

\* cited by examiner

END SEAL ASSEMBLY FOR AN UNDERCUT DEVELOPER ROLL

CROSS REFERENCES TO RELATED APPLICATIONS

None.

BACKGROUND

1. Field of the Disclosure

The present disclosure relates generally to electrophotographic image forming devices and, more particularly, to an end seal assembly for an undercut developer roll.

2. Description of the Related Art

Various seals are used in electrophotographic printers to prevent toner from leaking between the printer's components. For example, toner leakage may occur from gaps between a developer roll that supplies toner to a photoconductive drum of the electrophotographic printer, a doctor blade in contact with the developer roll and the housing of a developer unit that holds the developer roll and the doctor blade. Seals may be provided to effectively close the gaps between these components to prevent toner leakage. For example, an end seal may be used at each axial end of the developer roll to prevent toner from leaking out of the junction between the developer roll, the doctor blade and the housing of the developer unit.

One example includes a J-shaped end seal that includes a molded body composed of an elastomeric material. These end seals include a curved rotary seal portion having an inner circumferential surface that contacts a portion of the outer circumferential surface of the developer roll. Some end seals include one or more cantilevered ribs formed integrally with the seal body on an outer circumferential surface of the end seal that contact the housing of the developer unit in order to bias the inner circumferential surface of the end seal against the outer circumferential surface of the developer roll to maintain a desired sealing force. However, the cantilevered ribs tend to suffer from compression set issues causing the sealing force to decrease over time. Other end seals include a foam backing adhered to the outer circumferential surface of the end seal that biases the inner circumferential surface of the end seal against the outer circumferential surface of the developer roll. The foam backing has a relatively low compression set providing a more consistent sealing force over time. However, the foam backing increases the material cost and the manufacturing complexity and cost of the end seal.

Accordingly, an improved end seal assembly is desired that is cost effective and that has a relatively low compression set.

SUMMARY

A developer unit for an electrophotographic image forming device according to one example embodiment includes a housing and a developer roll rotatably mounted on the housing. The developer roll includes a shaft defining a rotational axis of the developer roll. The developer roll includes a roll body cylindrically disposed around the shaft and forming an outer circumferential surface of the developer roll. An axial end of the roll body includes an undercut forming a hollow region in the axial end of the roll body between the shaft and the outer circumferential surface. An elastomeric end seal has a curved rotary seal portion that is sandwiched between a portion of the housing and the outer circumferential surface of the developer roll at the axial end of the developer roll. An interference between the curved rotary seal portion of the end seal and the outer circumferential surface of the developer roll decreases along an axial dimension of the developer roll in a direction from an axially outboard edge of the end seal toward an axially inboard edge of the end seal.

A developer unit for an electrophotographic image forming device according to another example embodiment includes a housing and a developer roll rotatably mounted on the housing. The developer roll includes a shaft defining a rotational axis of the developer roll. The developer roll includes a roll body cylindrically disposed around the shaft and forming an outer circumferential surface of the developer roll. An axial end of the roll body includes an undercut forming a hollow region in the axial end of the roll body between the shaft and the outer circumferential surface. An elastomeric end seal has a curved rotary seal portion that is sandwiched between a portion of the housing and the outer circumferential surface of the developer roll at the axial end of the developer roll. An overall thickness of the curved rotary seal portion of the end seal along a radial dimension of the developer roll decreases along an axial dimension of the developer roll in a direction from an axially outboard edge of the end seal toward an axially inboard edge of the end seal providing an interference between the curved rotary seal portion of the end seal and the outer circumferential surface of the developer roll that decreases along the axial dimension of the developer roll in the direction from the axially outboard edge of the end seal toward the axially inboard edge of the end seal. In some embodiments, the end seal is positioned in a pocket on the portion of the housing and a depth of a surface of the housing that forms the pocket along the radial dimension of the developer roll is uniform along the axial dimension of the developer roll.

An end seal for a developer roll of an electrophotographic image forming device according to one example embodiment includes an elastomeric body having a curved rotary seal portion for sealing against an outer circumferential surface of a rotatable developer roll at an axial end of the developer roll. An overall thickness of the curved rotary seal portion of the body along a radial dimension of the end seal decreases from an axially outboard edge of the end seal to an axially inboard edge of the end seal for providing an interference between the end seal and the outer circumferential surface of the developer roll that decreases from the axially outboard edge of the end seal to the axially inboard edge of the end seal.

A developer unit for an electrophotographic image forming device according to another example embodiment includes a housing and a developer roll rotatably mounted on the housing. The developer roll includes a shaft defining a rotational axis of the developer roll. The developer roll includes a roll body cylindrically disposed around the shaft and forming an outer circumferential surface of the developer roll. An axial end of the roll body includes an undercut forming a hollow region in the axial end of the roll body between the shaft and the outer circumferential surface. An elastomeric end seal is positioned in a pocket on the housing and sandwiched between a surface of the housing that forms the pocket and the outer circumferential surface of the developer roll at the axial end of the developer roll. A depth of the surface of the housing that forms the pocket along a radial dimension of the developer roll decreases along an axial dimension of the developer roll in a direction from an axially outboard edge of the end seal toward an axially inboard edge of the end seal providing an interference between the end seal and the outer circumferential surface of the developer roll that decreases along the axial dimension of the developer roll in the direction from the axially outboard edge of the end seal toward the axially inboard edge of the end seal. In some embodiments, an overall thickness of the end seal along the radial dimension of the developer roll is uniform along the axial dimension of the developer roll.

BRIEF DESCRIPTION OF THE DRAWINGS

The accompanying drawings incorporated in and forming a part of the specification, illustrate several aspects of the present disclosure, and together with the description serve to explain the principles of the present disclosure.

DETAILED DESCRIPTION

In the following description, reference is made to the accompanying drawings where like numerals represent like elements. The embodiments are described in sufficient detail to enable those skilled in the art to practice the present disclosure. It is to be understood that other embodiments may be utilized and that process, electrical, and mechanical changes, etc., may be made without departing from the scope of the present disclosure. Examples merely typify possible variations. Portions and features of some embodiments may be included in or substituted for those of others. The following description, therefore, is not to be taken in a limiting sense and the scope of the present disclosure is defined only by the appended claims and their equivalents.

Figure 1:
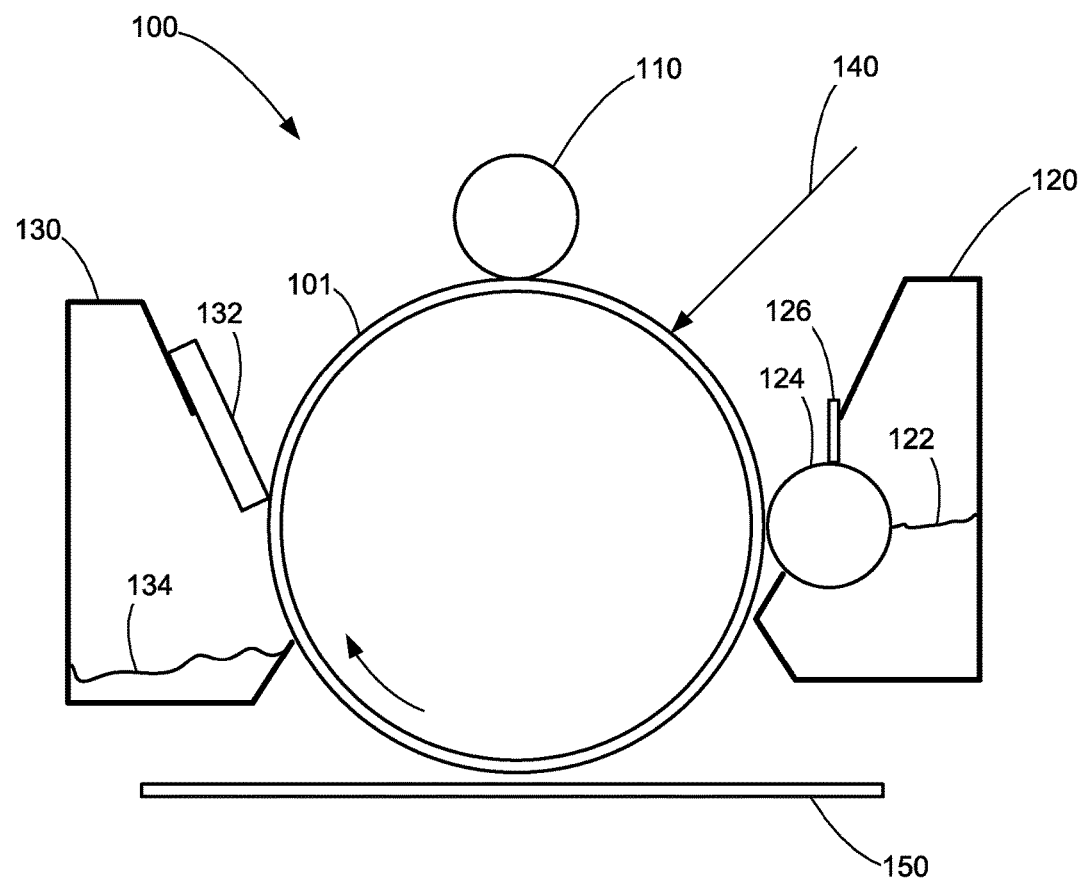
FIG. 1 is a schematic view of an electrophotographic image forming device according to one example embodiment.

FIG. 1 illustrates a schematic representation of an example electrophotographic image forming device 100. Image forming device 100 includes a photoconductive drum 101, a charge roll 110, a developer unit 120 and a cleaner unit 130. The electrophotographic printing process is well known in the art and, therefore, is described briefly herein.

During a print operation, charge roll 110 charges the surface of photoconductive drum 101. The charged surface of photoconductive drum 101 is then selectively exposed to a laser light source 140 to form an electrostatic latent image on photoconductive drum 101 corresponding to the image being printed. Charged toner from developer unit 120 is picked up by the latent image on photoconductive drum 101 creating a toned image.

Developer unit 120 includes a toner reservoir 122 having toner particles stored therein and a developer roll 124 that supplies toner from toner reservoir 122 to photoconductive drum 101. Developer roll 124 is electrically charged and electrostatically attracts the toner particles from toner reservoir 122. A doctor blade 126 disposed along developer roll 124 provides a substantially uniform layer of toner on developer roll 124 for subsequent transfer to photoconductive drum 101. As developer roll 124 and photoconductive drum 101 rotate, toner particles are electrostatically transferred from developer roll 124 to the latent image on photoconductive drum 101 forming a toned image on the surface of photoconductive drum 101. In one embodiment, developer roll 124 and photoconductive drum 101 rotate in opposite rotational directions such that their adjacent surfaces move in the same direction to facilitate the transfer of toner from developer roll 124 to photoconductive drum 101. A toner adder roll (not shown) may also be provided to supply toner from toner reservoir 122 to developer roll 124. Further, one or more agitators (not shown) may be provided in toner reservoir 122 to distribute the toner therein and to break up any clumped toner.

The toned image is then transferred from photoconductive drum 101 to print media 150 (e.g., paper) either directly by photoconductive drum 101 or indirectly by an intermediate transfer member. A fusing unit (not shown) fuses the toner to print media 150. A cleaning blade 132 (or cleaning roll) of cleaner unit 130 removes any residual toner adhering to photoconductive drum 101 after the toner is transferred to print media 150. Waste toner from cleaning blade 132 is held (permanently or temporarily) in a waste toner reservoir 134 in cleaning unit 130. The cleaned surface of photoconductive drum 101 is then ready to be charged again and exposed to laser light source 140 to continue the printing cycle.

The components of image forming device 100 are replaceable as desired. For example, in one embodiment, developer unit 120 is housed in a replaceable unit with photoconductive drum 101, cleaner unit 130 and the main toner supply of image forming device 100. In another embodiment, developer unit 120 is provided with photoconductive drum 101 and cleaner unit 130 in a first replaceable unit while the main toner supply of image forming device 100 is housed in a second replaceable unit. In another embodiment, developer unit 120 is provided with the main toner supply of image forming device 100 in a first replaceable unit and photoconductive drum 101 and cleaner unit 130 are provided in a second replaceable unit. In another embodiment, developer unit 120 is provided in a first replaceable unit, the main toner supply of image forming device 100 is provided in a second replaceable unit and photoconductive drum 101 and cleaner unit 130 are provided in a third replaceable unit. Further, any other combination of replaceable units may be used as desired.

Figure 2:
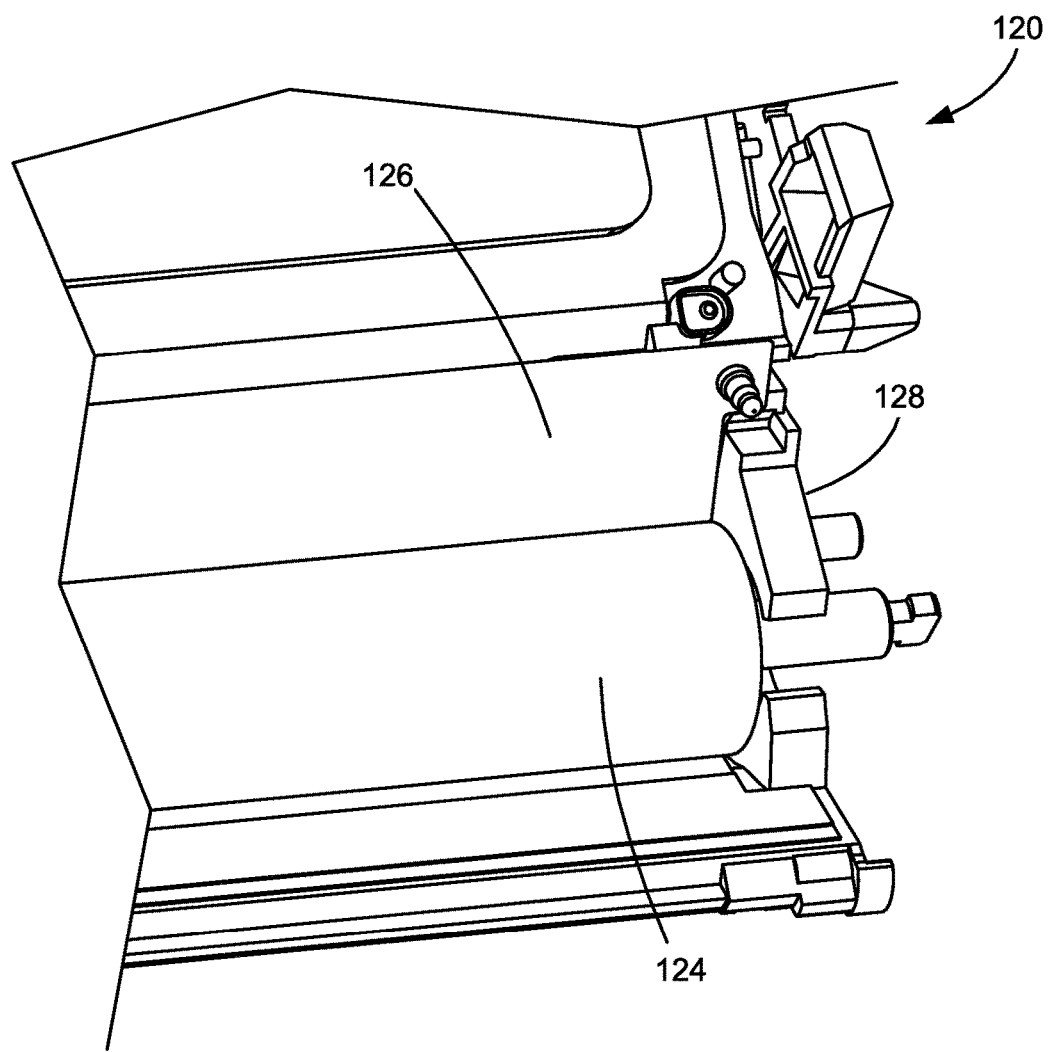
FIG. 2 is a perspective view of a portion of a developer unit according to one example embodiment.
Figure 3:
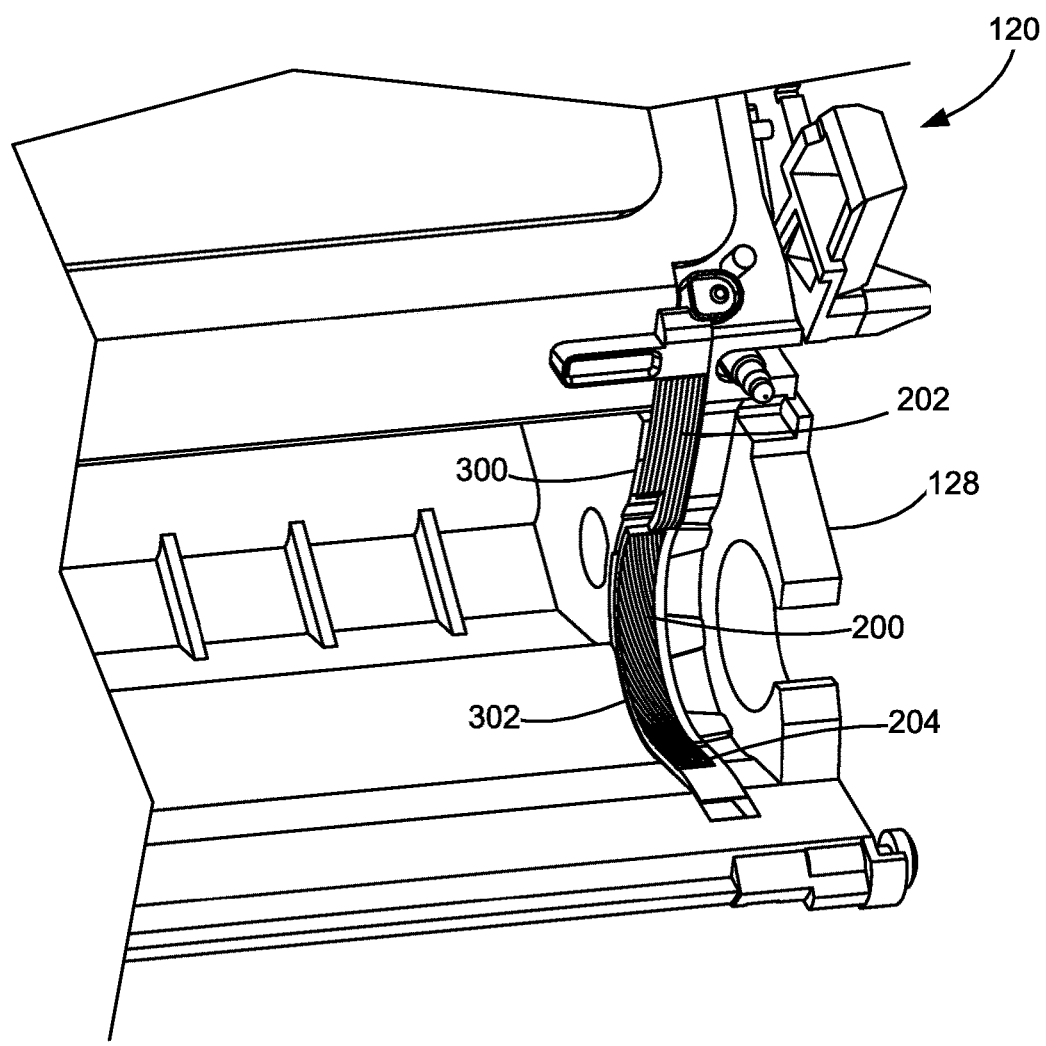
FIG. 3 is a perspective view of the developer unit shown in FIG. 2 with a developer roll and a doctor blade omitted to show an end seal according to one example embodiment.

FIG. 2 illustrates an example replaceable developer unit 120 including a housing 128 containing developer roll 124 rotatably mounted on housing 128 and doctor blade 126 positioned against developer roll 124. FIG. 3 shows developer unit 120 with developer roll 124 and doctor blade 126 omitted to more clearly illustrate the internal components of developer unit 120. FIG. 3 shows an example end seal 200 positioned in housing 128 at one axial end of developer roll 124. A second end seal (not shown) is positioned at the opposite axial end of developer roll 124 and may be substantially the same as end seal 200. A blade seal portion 202 of end seal 200 is compressed between an interface 300 formed in housing 128 and an end portion of doctor blade 126 (FIG. 2). A rotary seal portion 204 of end seal 200 is compressed between a curved interface 302 formed in housing 128 and an axial end portion of developer roll 124 (FIG. 2).

Figure 4:
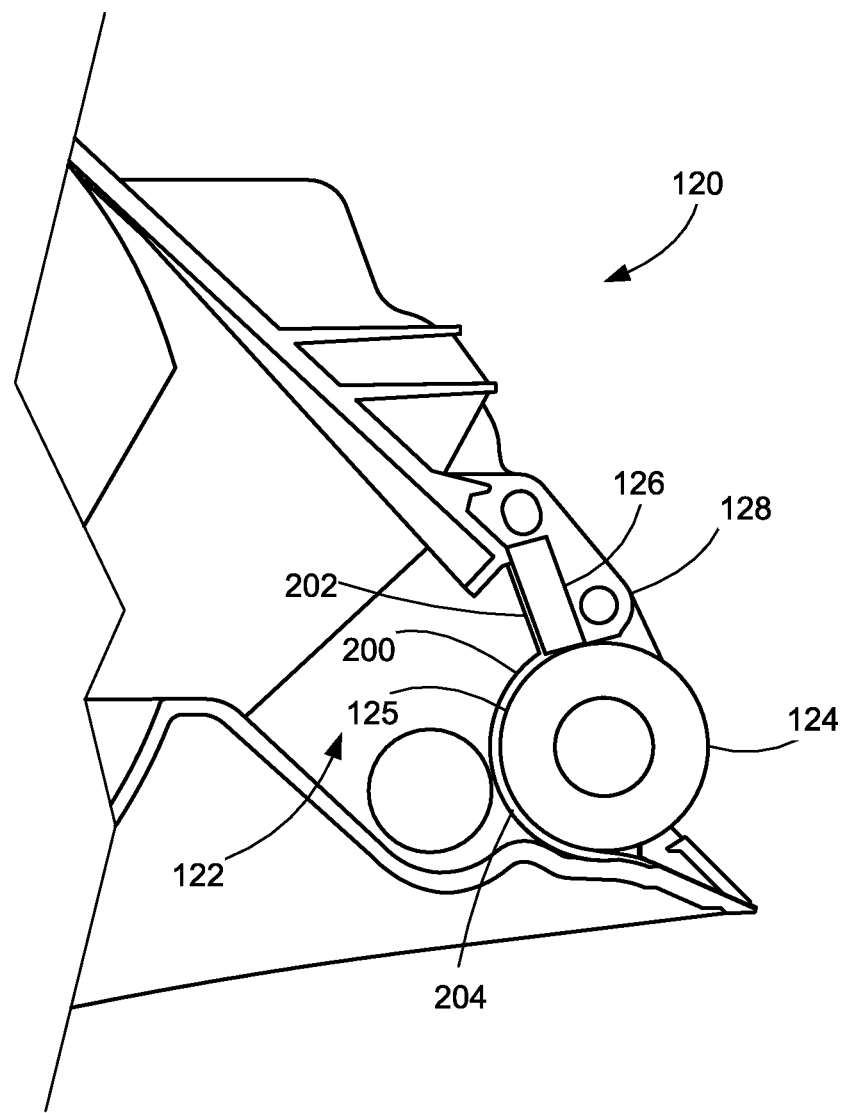
FIG. 4 is a sectional side view of the developer unit shown in FIGS. 2 and 3.

FIG. 4 shows a side view of end seal 200 in housing 128 positioned against developer roll 124 and doctor blade 126. As shown in FIG. 4, blade seal portion 202 of end seal 200 is positioned against a rear surface of doctor blade 126 and rotary seal portion 204 of end seal 200 is curved around and positioned against a rear portion of an outer circumferential surface 125 of developer roll 124. End seal 200 may be described as J-shaped due to its substantially straight blade seal portion 202 and connecting curved rotary seal portion 204. End seal 200 prevents toner from leaking at axial ends of developer roll 124 at the interface between housing 128, developer roll 124 and doctor blade 126.

Figure 5:
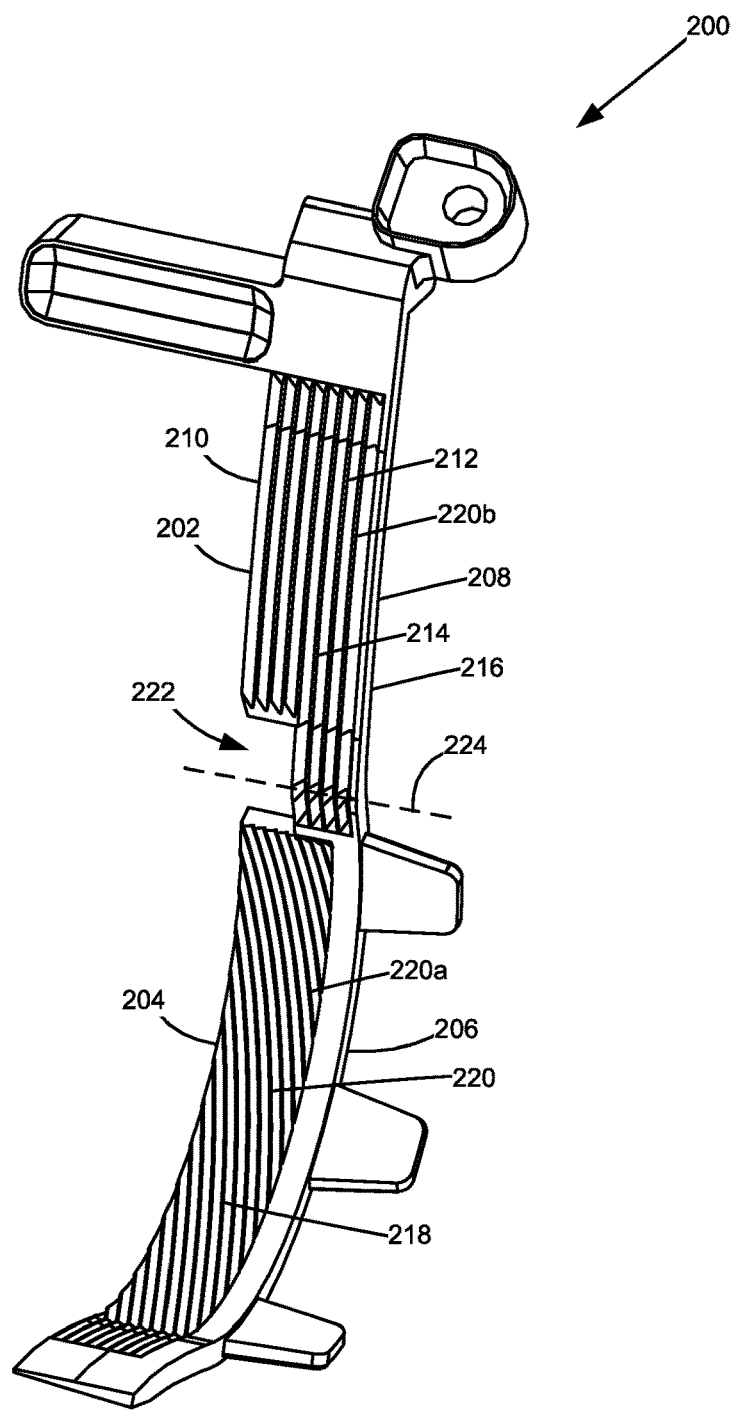
FIG. 5 is a front perspective view of the end seal shown in FIGS. 3 and 4.

FIG. 5 shows end seal 200 in greater detail according to one example embodiment. In some embodiments, end seal 200 includes a molded (e.g., injection molded or compression molded) body 206 made of polymeric elastomeric material. One suitable example of an elastomeric material is SANTOPRENE™, a thermoplastic vulcanizate available from Exxon Mobil Corporation. End seal 200 includes an axially outboard edge 208 and an axially inboard edge 210 relative to developer roll 124. End seal 200 also includes a front side 212 that forms a sealing face 214 of end seal 200 and a rear side 216 opposite front side 212. Sealing face 214 includes the front side 212 of blade seal portion 202 of end seal 200 that contacts a rear side of doctor blade 126. Sealing face 214 also includes an inner circumferential surface 218 of rotary seal portion 204 on front side 212 of rotary seal portion 204 that contacts a portion of outer circumferential surface 125 of developer roll 124. In the example embodiment illustrated, sealing face 214 of end seal 200 includes grooves 220 therein to prevent the migration of toner axially outward past end seal 200. Grooves 220 may be formed between small ribs on sealing face 214 of end seal 200. Grooves 220a on sealing face 214 of rotary seal portion 204 may be angled to guide toner away from the axial end of developer roll 124 as developer roll 124 rotates against rotary seal portion 204. Grooves 220a are open at axially inboard edge 210 to allow developer roll 124 to push toner through grooves 220a, off of end seal 200 and back into toner reservoir 122 as developer roll 124 rotates. Grooves 220b on blade seal portion 202 may be vertically oriented as illustrated (parallel to a longitudinal dimension of end seal 200). End seal 200 may also include an optional notch or cutout 222 therein on the axially inboard edge 210 of end seal 200 for providing an additional exit path for toner to escape end seal 200 back into toner reservoir 122. In the embodiment illustrated, cutout 222 is positioned at an intersection 224 of blade seal portion 202 and rotary seal portion 204 at the axially inboard edge 210 of end seal 200.

Figure 6A:
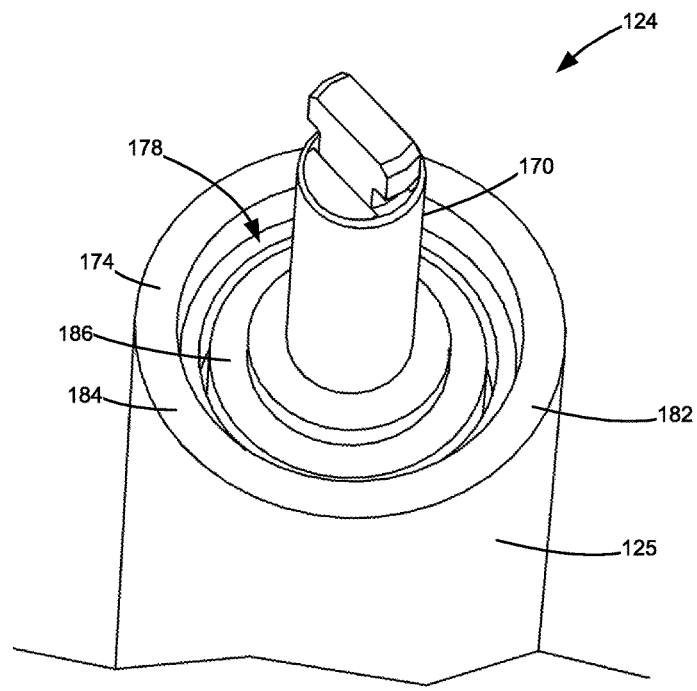
FIGS. 6A, 6B and 6C are a side perspective view, a side elevation view and a cross-sectional view taken along line 6C-6C in FIG. 6B, respectively, of the developer roll having an undercut according to one example embodiment.
Figure 6B:
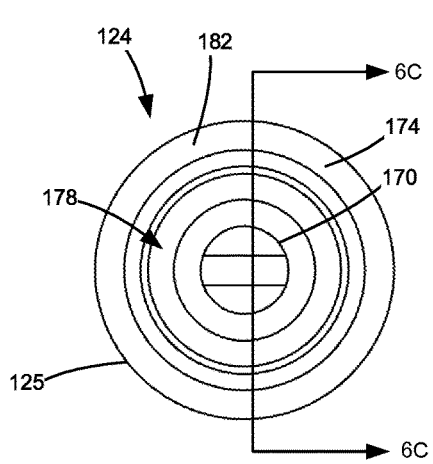
Figure 6C:
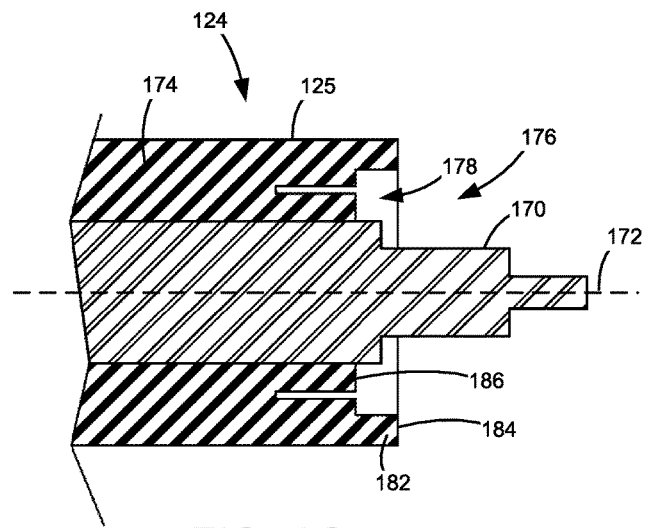

FIGS. 6A-6C illustrate an example developer roll 124 having a shaft 170 defining a rotational axis 172 of developer roll 124 and a roll body 174 cylindrically disposed around shaft 170 and forming outer circumferential surface 125 of developer roll 124. An axial end 176 of roll body 174 includes an undercut 178 forming a hollow region in axial end 176 of roll body 174 between shaft 170 and outer circumferential surface 125 of roll body 174. The opposite axial end of developer roll 124 may include an undercut in substantially the same manner as axial end 176 illustrated. Undercut 178 is preferably molded into roll body 174 during the formation of roll body 174. Alternatively, undercut 178 may be created after the formation of roll body 174 by physically removing material from axial end 176 of roll body 174, e.g., by a blade, router, laser, etc. The stiffness of roll body 174 near axial end 176 varies axially as a result of a cantilevered portion 182 of roll body 174 formed by undercut 178. In particular, the stiffness of roll body 174 increases from an outermost axial edge 184 of roll body 174 axially inward to an innermost axial point 186 of undercut 178 such that the stiffness of roll body 174 at outermost axial edge 184 of roll body 174 is less than the stiffness of roll body 174 at innermost axial point 186 of undercut 178.

Figure 7:
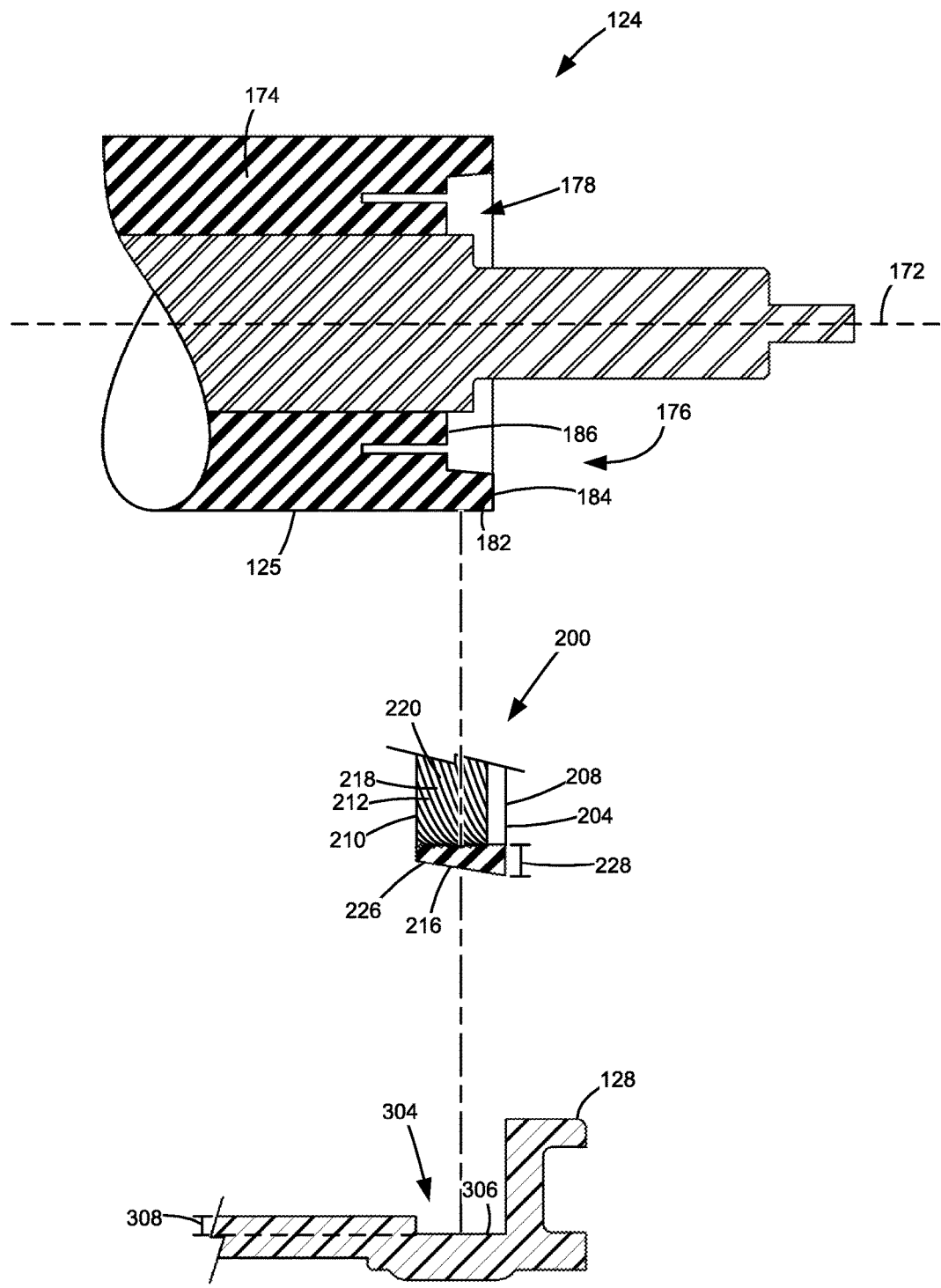
FIG. 7 is an exploded cross-sectional view of the developer roll, the end seal and a pocket formed in a housing of the developer unit according to one example embodiment.

FIG. 7 illustrates an exploded cross-sectional view illustrating the relative positioning of axial end 176 of developer roll 124, end seal 200 and a pocket 304 formed in housing 128 of developer unit 120 according to one example embodiment. End seal 200 is sandwiched between outer circumferential surface 125 of developer roll 124 at axial end 176 of developer roll 124 and pocket 304 of housing 128. In particular, inner circumferential surface 218 on front side 212 of rotary seal portion 204 of end seal 200 contacts outer circumferential surface 125 of developer roll 124 and an outer circumferential surface 226 on rear side 216 of rotary seal portion 204 of end seal 200 contacts a surface 306 of housing 128 forming pocket 304. Developer roll 124, end seal 200 and pocket 304 are positioned such that inner circumferential surface 218 of rotary seal portion 204 of end seal 200 interferes with outer circumferential surface 125 of developer roll 124 thereby pressing outer circumferential surface 226 of rotary seal portion 204 of end seal 200 against surface 306 forming pocket 304. In this manner, cantilevered portion 182 of roll body 174 of developer roll 124 formed by undercut 178 provides a bias force to end seal 200 to maintain sealing contact between inner circumferential surface 218 of rotary seal portion 204 of end seal 200 and outer circumferential surface 125 of developer roll 124.

In the example embodiment illustrated in FIG. 7, pocket 304 has a uniform depth 308 measured along a radial dimension of developer roll 124. In this embodiment, rotary seal portion 204 of end seal 200 has a varying thickness 228 measured along the radial dimension of developer roll 124 that decreases from axially outboard edge 208 to axially inboard edge 210 of end seal 200. In the example embodiment illustrated, at the inner circumferential surface 218 of rotary seal portion 204, the thickness 228 of end seal 200 is measured from the peaks of the ribs forming grooves 220 such that the slight decreases in thickness 228 of end seal 200 caused by the valleys forming grooves 220 are disregarded. The varying thickness 228 of rotary seal portion 204 of end seal 200 compensates for the varying stiffness of developer roll 124 in order to provide a more uniform sealing force distribution axially along developer roll 124. In particular, the greater thickness 228 of end seal 200 at axially outboard edge 208 provides greater interference between inner circumferential surface 218 of rotary seal portion 204 of end seal 200 and outer circumferential surface 125 of developer roll 124 in order to compensate for the reduced stiffness of roll body 174 at outermost axial edge 184 of roll body 174. The reduced thickness 228 of end seal 200 at axially inboard edge 210 provides less interference between inner circumferential surface 218 of rotary seal portion 204 of end seal 200 and outer circumferential surface 125 of developer roll 124 in order to compensate for the increased stiffness of roll body 174 at innermost axial point 186 of undercut 178. If, on the other hand, end seal 200 having a varying thickness 228 from axially outboard edge 208 to axially inboard edge 210 were replaced with an end seal having a uniform thickness, the varying stiffness of roll body 174 resulting from undercut 178 would provide an uneven force distribution across the width of the end seal that increased from the axially outboard edge of the end seal to the axially inboard edge of the end seal. This uneven force distribution could reduce the operating window of the end seal by consuming the range between a point where excessive sealing force risks thermal problems (e.g., melting of toner due to excessive frictional heat) and a point where insufficient sealing force risks toner leakage. The varying thickness 228 of rotary seal portion 204 of end seal 200 reduces the variation in sealing force axially along developer roll 124 and, in turn, increases the operating window of end seal 200.

Figure 8:
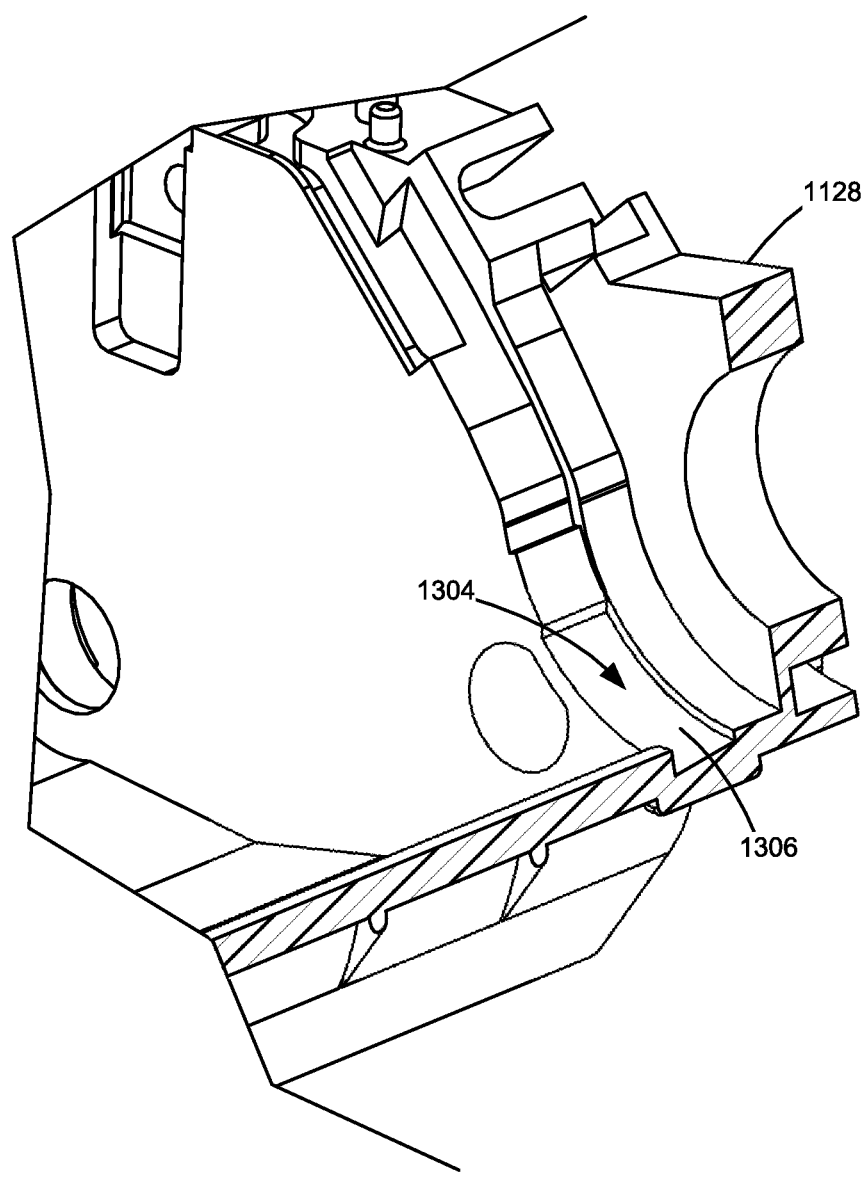
FIG. 8 is a perspective view of the developer unit with the developer roll, the doctor blade and the end seal omitted to show a pocket formed in the housing of the developer unit according to a second example embodiment.
Figure 9:
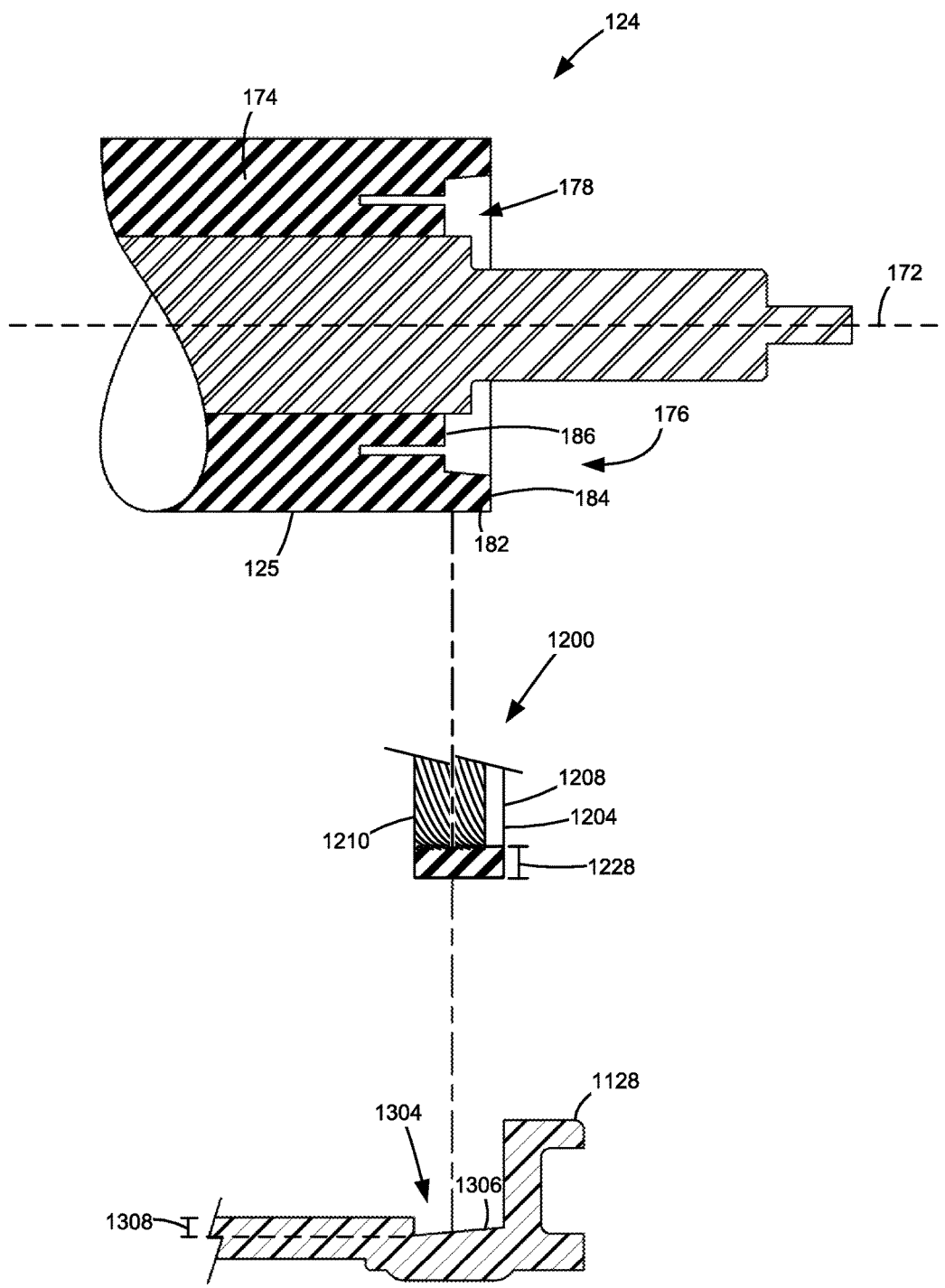
FIG. 9 is an exploded cross-sectional view of the developer roll, the end seal and a pocket formed in a housing of the developer unit according to the second example embodiment.

FIG. 8 illustrates another example embodiment of a surface 1306 of a housing 1128 that includes a pocket 1304 having a varying depth 1308 (FIG. 9) measured along a radial dimension of developer roll 124 that increases as pocket 1304 extends axially inward along rotational axis 172 of developer roll 124. With reference to FIG. 9, in this embodiment, a rotary seal portion 1204 of an end seal 1200 for use in pocket 1304 has a uniform thickness 1228 measured along the radial dimension of developer roll 124. The varying depth 1308 of pocket 1304 compensates for the varying stiffness of developer roll 124 in order to provide a more uniform sealing force distribution axially along developer roll 124 in the same manner as the varying thickness 228 of rotary seal portion 204 of end seal 200 discussed above. That is, the reduced depth 1308 of pocket 1304 at an axially outboard edge 1208 of end seal 1200 provides greater interference between end seal 1200 and developer roll 124 and the increased depth 1308 of pocket 1304 at an axially inboard edge 1210 of end seal 1200 provides less interference between end seal 1200 and developer roll 124 in order to compensate for the varying stiffness of roll body 174. Those skilled in the art will also appreciate that, in other embodiments, both the depth of the pocket 304, 1304 and the thickness of end seal 200, 1200 may vary in order to achieve a substantially uniform sealing force distribution axially along developer roll 124.

Roll body 174, which may be composed of, for example, urethane, has a lower compression set than end seal 200, 1200. As a result, the use of cantilevered portion 182 of roll body 174 to provide the bias force necessary to bias end seal 200, 1200 against developer roll 124 typically results in a more consistent sealing force over time in comparison with the use of one or more cantilevered ribs on an outer circumferential surface of the rotary seal portion of end seal 200, 1200. The use of cantilevered portion 182 of roll body 174 to provide the bias force necessary to bias end seal 200, 1200 against developer roll 124 also avoids the increased material cost and manufacturing complexity and cost associated with providing a foam backing adhered to the outer circumferential surface of end seal 200, 1200. In this manner, the present embodiments may provide a substantially uniform sealing force distribution axially along developer roll 124 in a cost effective manner, with a relatively low compression set.

The foregoing description illustrates various aspects of the present disclosure. It is not intended to be exhaustive. Rather, it is chosen to illustrate the principles of the present disclosure and its practical application to enable one of ordinary skill in the art to utilize the present disclosure, including its various modifications that naturally follow. All modifications and variations are contemplated within the scope of the present disclosure as determined by the appended claims. Relatively apparent modifications include combining one or more features of various embodiments with features of other embodiments.

The invention claimed is:

1. A developer unit for an electrophotographic image forming device, comprising:
   a housing;
   a developer roll rotatably mounted on the housing, the developer roll includes a shaft defining a rotational axis of the developer roll, the developer roll includes a roll body cylindrically disposed around the shaft and forming an outer circumferential surface of the developer roll, an axial end of the roll body includes an undercut forming a hollow region in the axial end of the roll body between the shaft and the outer circumferential surface; and
   an elastomeric end seal having a curved rotary seal portion that is sandwiched between a portion of the housing and the outer circumferential surface of the developer roll at the axial end of the developer roll, an interference between the curved rotary seal portion of the end seal and the outer circumferential surface of the developer roll decreases along an axial dimension of the developer roll in a direction from an axially outboard edge of the end seal toward an axially inboard edge of the end seal.

2. A developer unit for an electrophotographic image forming device, comprising:
   a housing;
   a developer roll rotatably mounted on the housing, the developer roll includes a shaft defining a rotational axis of the developer roll, the developer roll includes a roll body cylindrically disposed around the shaft and forming an outer circumferential surface of the developer roll, an axial end of the roll body includes an undercut forming a hollow region in the axial end of the roll body between the shaft and the outer circumferential surface; and
   an elastomeric end seal having a curved rotary seal portion that is sandwiched between a portion of the housing and the outer circumferential surface of the developer roll at the axial end of the developer roll, an overall thickness of the curved rotary seal portion of the end seal along a radial dimension of the developer roll decreases along an axial dimension of the developer roll in a direction from an axially outboard edge of the end seal toward an axially inboard edge of the end seal providing an interference between the curved rotary seal portion of the end seal and the outer circumferential surface of the developer roll that decreases along the axial dimension of the developer roll in the direction from the axially outboard edge of the end seal toward the axially inboard edge of the end seal.

3. The developer unit of claim 2, wherein the end seal is positioned in a pocket on the portion of the housing and a depth of a surface of the housing that forms the pocket along the radial dimension of the developer roll is uniform along the axial dimension of the developer roll.

4. An end seal for a developer roll of an electrophotographic image forming device, comprising:
   an elastomeric body having a curved rotary seal portion for sealing against an outer circumferential surface of a rotatable developer roll at an axial end of the developer roll, wherein an overall thickness of the curved rotary seal portion of the body along a radial dimension of the end seal decreases from an axially outboard edge of the end seal to an axially inboard edge of the end seal for providing an interference between the end seal and the outer circumferential surface of the developer roll that decreases from the axially outboard edge of the end seal to the axially inboard edge of the end seal.

5. A developer unit for an electrophotographic image forming device, comprising:
 a housing;
 a developer roll rotatably mounted on the housing, the developer roll includes a shaft defining a rotational axis of the developer roll, the developer roll includes a roll body cylindrically disposed around the shaft and forming an outer circumferential surface of the developer roll, an axial end of the roll body includes an undercut forming a hollow region in the axial end of the roll body between the shaft and the outer circumferential surface; and
 an elastomeric end seal positioned in a pocket on the housing and sandwiched between a surface of the housing that forms the pocket and the outer circumferential surface of the developer roll at the axial end of the developer roll,
wherein a depth of the surface of the housing that forms the pocket along a radial dimension of the developer roll decreases along an axial dimension of the developer roll in a direction from an axially outboard edge of the end seal toward an axially inboard edge of the end seal providing an interference between the end seal and the outer circumferential surface of the developer roll that decreases along the axial dimension of the developer roll in the direction from the axially outboard edge of the end seal toward the axially inboard edge of the end seal.

6. The developer unit of claim 5, wherein an overall thickness of the end seal along the radial dimension of the developer roll is uniform along the axial dimension of the developer roll.

* * * * *